(12) United States Patent  
Molnar et al.

(10) Patent No.: US 7,880,747 B1
(45) Date of Patent: Feb. 1, 2011

(54) BLEND OPTIMIZATIONS THAT ARE CONFORMANT TO FLOATING-POINT RULES

(75) Inventors: Steven E. Molnar, Chapel Hill, NC (US); Jerome F. Duluk, Jr., Palo Alto, CA (US); Henry P. Moreton, Woodside, CA (US); Daniel P. Wilde, Cedar Park, TX (US); Mark J. French, Raleigh, NC (US); Bengt-Olaf Schneider, Yorktown Heights, NY (US); Jonathan J. Dunaisky, Fort Collins, CO (US); Weizhong Xu, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 341 days.

(21) Appl. No.: 11/610,127

(22) Filed: Dec. 13, 2006

(51) Int. Cl.
*G09G 5/02* (2006.01)

(52) U.S. Cl. .................. 345/592; 345/589; 345/600; 345/614; 345/506; 345/556; 712/233; 712/234

(58) Field of Classification Search .................. None
See application file for complete search history.

(56) References Cited

U.S. PATENT DOCUMENTS

| | | | | |
|---|---|---|---|---|
| 5,388,205 A | * | 2/1995 | Cantor et al. | 345/501 |
| 5,421,028 A | * | 5/1995 | Swanson | 712/42 |
| 6,621,500 B1 | * | 9/2003 | Alcorn et al. | 345/629 |
| 6,738,069 B2 | * | 5/2004 | Doyle | 345/556 |
| 7,548,248 B2 | * | 6/2009 | Weybrew et al. | 345/629 |
| 2007/0071312 A1 | * | 3/2007 | Gardella et al. | 382/154 |

* cited by examiner

*Primary Examiner*—Antonio A Caschera
(74) *Attorney, Agent, or Firm*—Patterson & Sheridan, LLP.

(57) ABSTRACT

A technique for handling floating-point special values, e.g., Infinity, NaN, −Zero, and denorms, during blend operations is provided so that blend operations on fragment color values that contain special values can be performed in compliance with special value handling rules. In particular, the presence of special values is detected or the potential presence of special values is detected. This information is used to qualify when blend optimizations may be performed, so that floating point blend operations can remain conformant to special value handling rules.

16 Claims, 4 Drawing Sheets

BLEND OPTIMIZATIONS THAT ARE CONFORMANT TO FLOATING-POINT RULES

FIELD OF THE INVENTION

The present invention relates generally to graphics data operations, and more specifically to performing blend operations on floating-point data in such a manner as to optimize the processing of these blends while at the same time properly handling floating-point special values, such as Infinity, NaN, −Zero, and denorms.

BACKGROUND

In common graphics APIs (e.g., OpenGL and D3D), shaded fragment color values may be blended with color values that are stored in a frame buffer. After a blend operation, the blended color value is written into the frame buffer. The blend equation for each color component has the form:

$$Dst\_new = SrcFact * Src <operation> DstFact * Dst,$$ where

Src=the shaded fragment color value;

Dst=the current color value stored in the frame buffer;

SrcFact=coefficient that can be a source or destination alpha or color value, a constant, zero, one, etc.;

DstFact=coefficient that can be a source or destination alpha or color value, a constant, zero, one, etc.;

<operation>=blending operation (e.g., add, subtract, reverse subtract, min, max, etc.); and Dst_new=the blended color value.

Depending on the blend operation and the Src values, some color values may not change as the result of blending. For example, when using the standard alpha blend operation Dst_new=(SrcAlpha*Src+(1−SrcAlpha)*Dst), if SrcAlpha=0.0, the Dst_new value will equal Dst. It is common for a significant number of pixels to have SrcAlpha=0.0, particularly when rendering scenes with textured transparency. Similarly, it is also common for the Dst value to be unneeded. For example, if SrcAlpha=1.0, the Dst value does not need to be read.

Some graphics processing units (GPUs) implement blend optimizations to detect cases described above and kill fragments that will not cause a color update (e.g., when SrcAlpha=0.0) or suppress destination reads (e.g., when SrcAlpha=1.0). These blend optimizations were typically done for fixed-point data (e.g. 8-bit-per-component A8R8G8B8 color format), which have no representation for numbers outside the range [0.0, 1.0].

Recent GPUs support floating-point render target formats. Floating-point formats make blend optimizations difficult because of the presence of special values, such as −Zero, Inf, NaN, and denorms, and the requirement to handle special values in accordance with the IEEE standard for binary floating-point arithmetic (IEEE Standard 754) or similar standards mandated by the API (e.g. Microsoft Windows Graphics Foundation or DX10). For example, IEEE Standard 754 prescribes that 0*Inf must equal NaN and −0+0 must equal −0. Microsoft's DX10 prescribes that fp32 denorms must be flushed to zero when operated upon. However, if the blend optimizations described above are carried out in the presence of special values, these rules may be violated. The following example illustrates how the fp32 denorm flushing rule may be violated in the case where SrcAlpha=0.0 and Dst=denorm:

Without optimization: Dst_new=0.0*Src+1.0*Dst=0.0+1.0*denorm=0.0 (since denorms must flush to zero when operated upon).

With optimization: Dst_new=denorm.

The following example illustrates how the 0*Inf rule may be violated in the case where SrcAlpha=1.0, Src=0.5 and Dst=Inf Without optimization: Dst_new=1.0*Src+0.0*Dst=0.5+0.0*Inf=NaN With optimization: Dst_new=0.5

Pixel shaders typically do not generate special values. When this is true, the blend optimizations performed for fixed point buffers could also be applied to floating-point buffers. However, since pixel shaders are arbitrary programs written by a user, it is difficult or impossible to guarantee that a given shader program will never generate a special value. Therefore, what is needed is a way of allowing blend optimizations in cases in which special values are not present, and properly handling those cases in which special values are present.

SUMMARY OF THE INVENTION

The present invention provides a technique for handling floating-point special values during blend operations so that blend operations on data that contain special values can be performed in compliance with special value handling rules. In particular, according to embodiments of the present invention, the presence of special values is detected or the potential presence of special values is detected. This information is used to qualify when blend optimizations may be performed, so that floating point blend operations can remain conformant to special value handling rules.

According to an embodiment of the present invention, a processing unit for carrying out floating point blend operations employs a special value detector. The special value detector monitors for special values in the data to be processed by the processing unit. If a special value is detected in the data, blend optimization is disabled during subsequent blend operations.

The processing unit may employ two special value detectors. The first special value detector monitors for special values in the input data stream. Input data may include source colors sent for a primitive (can be more than one source, e.g., for dual-source blending), and constant colors (set by application). Each source or constant color is potentially 4 channels, i.e., 4 floating-point values. If a special value is detected in particular input data, blend optimization is disabled during blend operations performed on that input data. The second special value detector monitors for special values in the output data before the output data is written into a frame buffer. If a special value is detected in any output data, the frame buffer is marked dirty, indicating that the frame buffer contains a special value. The dirty marker disables blend optimizations on any subsequent blend operations involving data read from the frame buffer.

The present invention also provides a method for disabling blend optimizations during blend operations so that blend operations can remain conformant to special value handling rules. According to an embodiment of this method, one or both of the input data for and output data of blend operations are monitored for special values and the decision whether to disable blend optimizations is made based on whether special values are detected in the data. If a special value is detected in the input data, blend optimization is disabled locally, i.e., during blend operations involving that input data. If a special value is detected in the output data, the frame buffer in which the output data is stored is marked dirty and blend optimization is disabled globally, i.e., during subsequent blend operations involving contents of the frame buffer.

The present invention also provides a method for saving and restoring the dirty marker, in order to provide, for example, the following sequence: (1) performing blend operations on a first frame buffer subject to a dirty marker; (2) saving the value of the dirty marker associated with the first frame buffer; (3) performing blend operations on a second frame buffer; (4) restoring the value of the dirty marker associated with the first frame buffer; and (5) performing blend operations on the first frame buffer. By saving and restoring the dirty marker, it is possible to switch between a large number of frame buffers without losing track of whether blend optimizations can be performed or not.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

Figure 1:
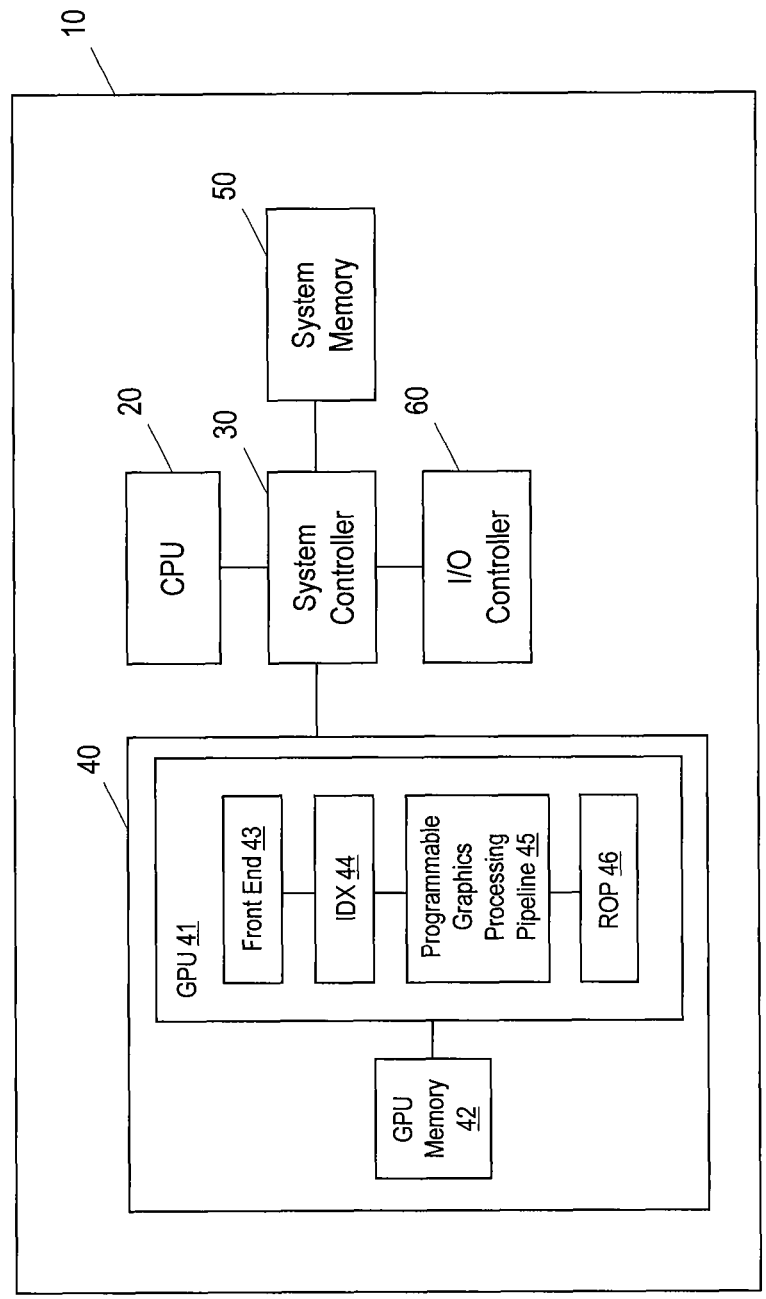
FIG. 1 illustrates a computing device in which embodiments of the present invention can be practiced.

FIG. 1 illustrates a computing device 10 in which embodiments of the present invention can be practiced. The computing device 10 includes a central processing unit (CPU) 20, a system controller hub 30 (sometimes referred to as a "northbridge"), a graphics subsystem 40, a main memory 50, and an input/output (I/O) controller hub 60 (sometimes referred to as a "southbridge") which is interfaced with a plurality of I/O devices (not shown), such as a network interface device, disk drives, USB devices, etc.

The graphics subsystem 40 includes a graphics processing unit (GPU) 41 and a GPU memory 42. GPU 41 includes, among other components, front end 43 that receives commands from the CPU 20 through the system controller hub 30. Front end 43 interprets and formats the commands and outputs the formatted commands and data to an IDX (Index Processor) 44. Some of the formatted commands are used by programmable graphics processing pipeline 45 to initiate processing of data by providing the location of program instructions or graphics data stored in memory, which may be GPU memory 42, system memory 50, or both. Results of programmable graphics processing pipeline 45 are passed to a raster operations unit (ROP) 46, which performs raster operations such as stencil, z test, and the like, and saves the results or the samples output by programmable graphics processing pipeline 45 in a render target, e.g., a frame buffer in GPU memory 42 or system memory 50.

Figure 2:
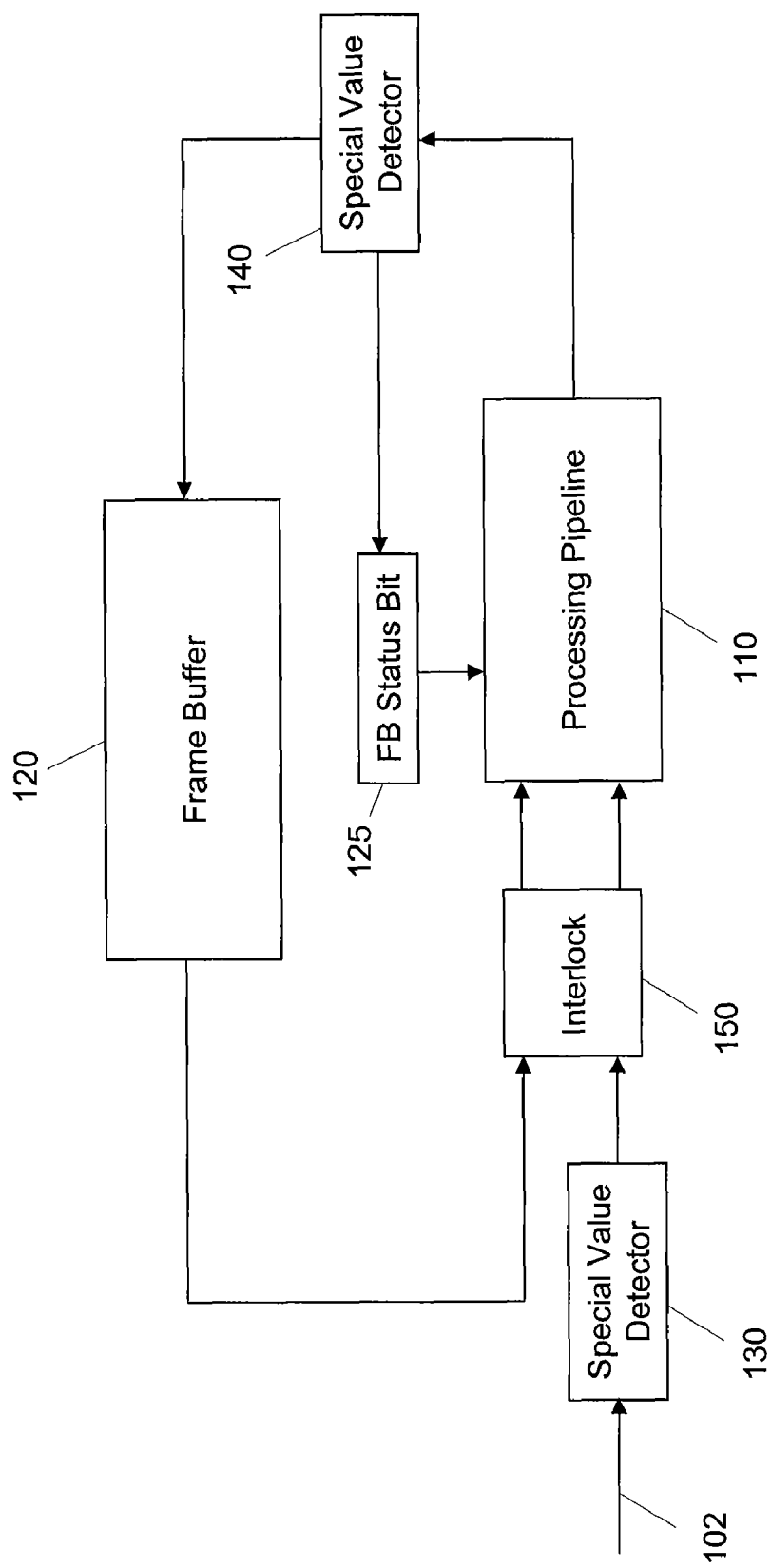
FIG. 2 is a simplified block diagram of a processing unit that is configured to perform blend operations in accordance with a first embodiment of the present invention.

FIG. 2 is a simplified block diagram of a processing unit that is configured to perform blend operations in accordance with a first embodiment of the present invention. The processing unit according to this embodiment is GPU 41 shown in FIG. 1 that is configured with a processing pipeline 110 for carrying out floating point blend operations on input data from a source data stream 102 and graphics data stored in a frame buffer 120. The result of the blend operations is written back to the frame buffer 120. Two examples of the processing pipeline 110 are a depth raster operations pipeline (ZROP) or a color raster operations pipeline (CROP). In the case of a CROP, input data corresponds to a shaded color value and graphics data stored in the frame buffer 120 corresponds to current color value. An interlock 150 is positioned directly upstream of the processing pipeline 110 for holding a blend operation that is dependent on results of a prior blend operation until the results of the prior blend operation are available to be read.

The processing pipeline 110 is operable in a normal processing mode and an optimized processing mode. In the normal processing mode, blend optimization is disabled. In the optimized processing mode, blend optimization is enabled. The processing pipeline 110 operates in the normal processing mode in one of two ways. First, when a special value is detected in the input data from the source data stream 102 by a special value detector 130, the subsequent blend operation performed on that input data is carried out in the normal processing mode. Second, when a special value is detected in the output data stream of the processing pipeline 110 by a special value detector 140, a frame buffer status bit 125 is marked "dirty" (e.g., set to "1"), and all subsequent blend operations performed by the processing pipeline 110 are carried out in the normal processing mode, until the frame buffer 120 is declared "clean" and the frame buffer status bit 125 is reset (e.g., set to "0").

The frame buffer 120 can be declared "clean" in several different ways. The frame buffer 120 can be declared "clean" if the values in the frame buffer 120 are known not to include any special values, e.g., when it is written with known values in connection with its initialization or after an explicit clear. Another way in which the frame buffer 120 can be declared "clean" is if the application software knows that the frame buffer 120 does not contain any special values. The last way in which the frame buffer 120 can be declared "clean" is if the entire contents of the frame buffer 120 are checked for special values and none are detected.

In operation, special value detector 130 monitors the source data stream 102 for input data containing special values. Interlock 150 holds any blend operation that is dependent on results of a prior blend operation until the results of the prior blend operation are available to be read from the frame buffer 120. If there is no such dependency or the results of the prior blend operation become available in the frame buffer 120, the input data from the source stream and the data from the frame buffer 120 are supplied to the processing pipeline 110 for blend operations to be performed. If the special value detector 130 determines that the input data contains a special value, e.g., −Zero, Inf, NaN, or denorm, or the frame buffer status bit 125 has been marked "dirty" based on an output from a prior blend operation, the processing pipeline 110 operates in the normal processing mode. Otherwise, the processing pipeline 110 operates in the optimized processing mode. After blend operation is performed, the results are output through special value detector 140 to be written into the frame buffer 120. Special value detector 140 monitors the output results from the processing pipeline 110. If the special value detector 140 detects a special value in the output results, the frame buffer status bit 125 is marked "dirty," and all subsequent blend operations performed by the processing pipeline 110 are carried out in the normal processing mode, until the frame buffer 120 is declared "clean" and the frame buffer status bit 125 is reset.

When special value detector 130 does not detect a special value in an input data of the source data stream 102, blend operations on that input data are carried out through the processing pipeline 110 with blend optimization enabled so long as the frame buffer status bit 125 is marked "clean." On the other hand, when special value detector 130 detects a special value in an input data of the source data stream 102, blend operations on that input data are carried out through the processing pipeline 110 with blend optimization disabled. The disabling of the blend optimization in this manner applies locally, i.e., only to blend operations on the input data having the special value. It does not carry over to subsequent input data in the source data stream 102. When special value detector 140 detects a special value in the output data stream, all subsequent blend operations are carried out through the processing pipeline 110 with blend optimization disabled. The disabling of the blend optimization in this manner thus applies globally, i.e., to all subsequent blend operations, until the frame buffer 120 is declared "clean" and the frame buffer status bit 125 is reset.

Figure 3:
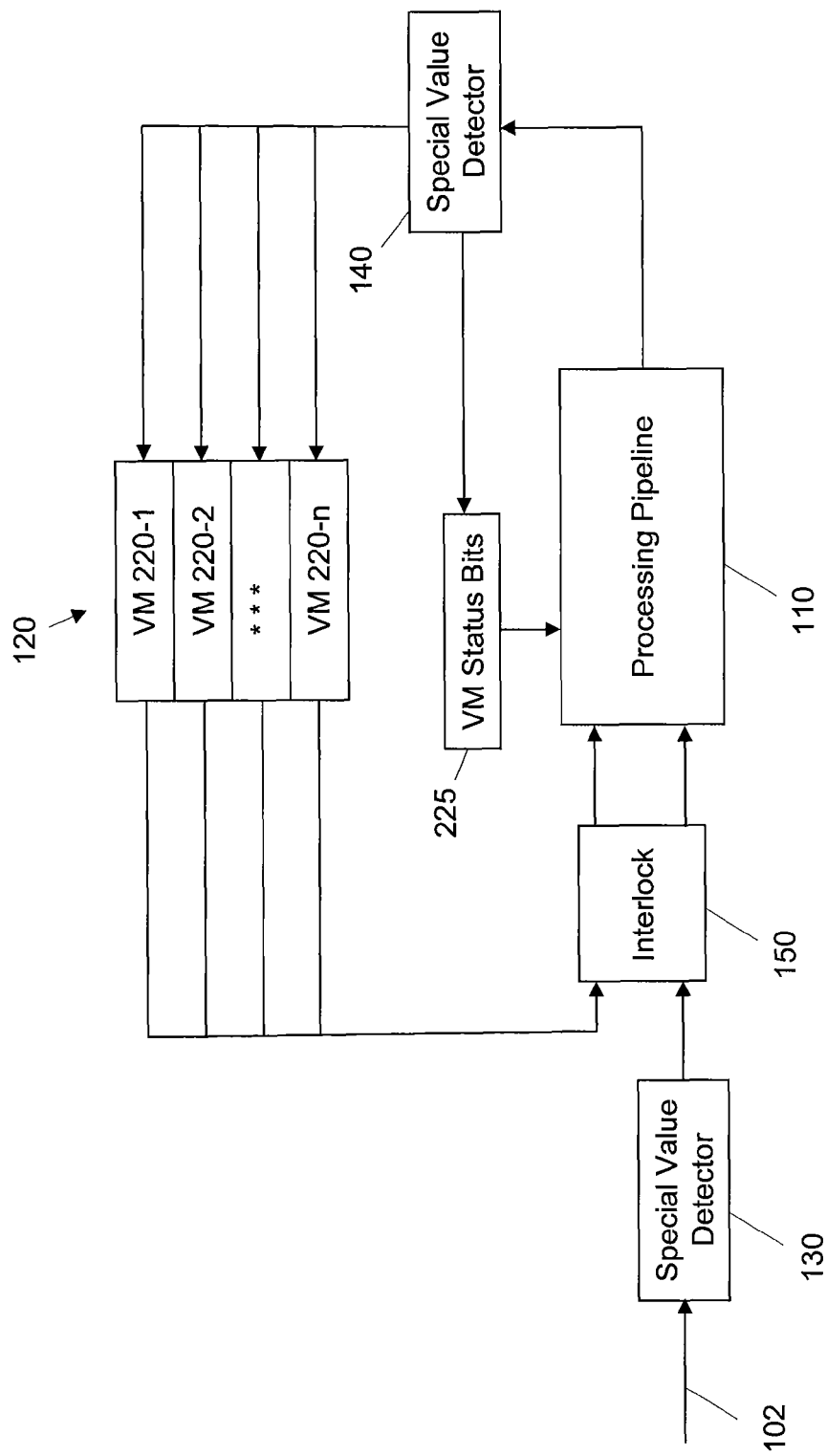
FIG. 3 is a simplified block diagram of a processing unit that is configured to perform blend operations in accordance with a second embodiment of the present invention.

FIG. 3 is a simplified block diagram of a processing unit that is configured to perform blend operations in accordance with a second embodiment of the present invention. The elements of this block diagram having the same reference numerals as those in FIG. 2 operate in the same manner as described above with reference to FIG. 2.

The primary difference between the first and second embodiments is as follows. In the first embodiment, a status bit 125 is maintained for the frame buffer 120. In the second embodiment, a status bit 225 is maintained for each of virtual memory pages 220-1 through 220-n. Thus, in the second embodiment, if the output results from the processing pipeline 110 contain a special value and the output results are to be written into virtual memory page 220-x, the status bit 225 for virtual memory page 220-x is marked "dirty," so that all subsequent blend operations on data stored in virtual memory page 220-x are carried out with blend optimization disabled, until that virtual memory page is declared "clean" and the status bit 225 for that virtual memory page is reset.

Figure 4:
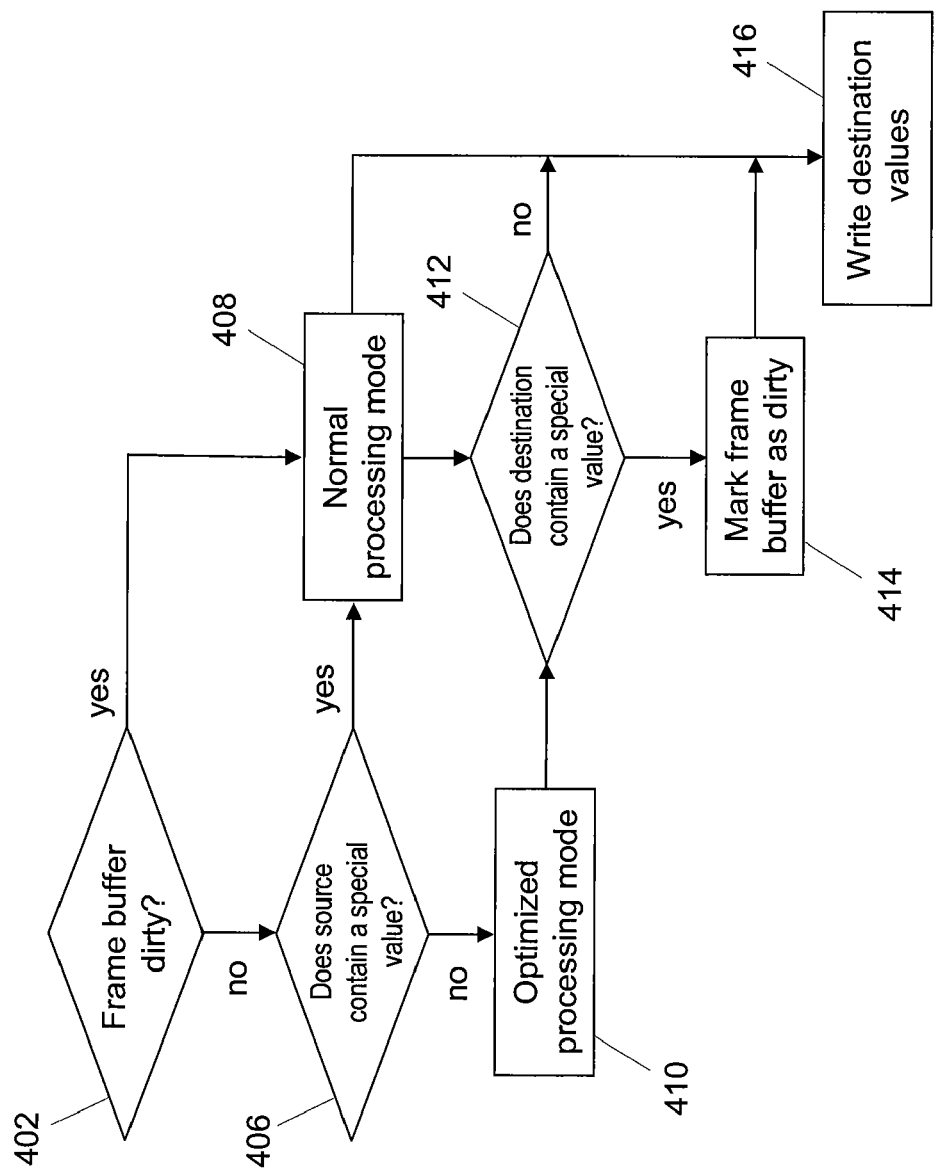
FIG. 4 is a flow diagram that illustrates the steps for carrying out blend operations in accordance with an embodiment of the present invention.

FIG. 4 is a flow diagram that illustrates the steps for carrying out blend operations in accordance with a first embodiment of the present invention. The process begins in step 402 with a check on the frame buffer status bit 125 to see if the frame buffer is "dirty." If the condition in step 402 is true, blend optimization is disabled globally and the processing pipeline 110 operates in the normal processing mode (step 408) until the frame buffer 120 is declared "clean" and the frame buffer status bit 125 is reset. If the condition in step 402 is false, flow proceeds to step 406 where the input data from the source data stream 102 is examined to see if it contains a special value. If the input data contains a special value, blend optimization is disabled locally and the processing pipeline 110 operates in the normal processing mode (step 408). If the input data does not contain a special value, blend optimization is not disabled, and the processing pipeline 110 operates in the optimized processing mode (step 410).

After the processing pipeline 110 performs blend operations in either the normal processing mode (step 408) or the optimized processing mode (step 410), the special value detector 140 monitors the destination stream for special values (step 412). If any data in the destination stream contains a special value, the frame buffer status bit is marked "dirty" by setting the frame buffer status bit 125 to be "1" (step 414).

Step 416 is carried out after any of steps 408, 412 and 414. In this step, the data in the destination stream are written into the frame buffer 120.

In some graphics application programs, a first rendering pass, including blending, is done to a first frame buffer, then a second rendering pass, including blending, is done to a second frame buffer, and then a third rendering pass, including blending, is done to the first frame buffer. For the embodiment shown in FIG. 2, it is advantageous to save the frame buffer status bit 125 at the end of the first rendering pass and restore the frame buffer status bit 125 at the beginning of the third rendering pass. Saving and restoring of the frame buffer status bit 125 can be done with CPU read and write operations, but that could be disadvantageous because asynchronous reads and writes can generally only be done while the processing pipeline 110 is idle. Pipelined reads and writes solve this problem, and are done with commands sent to the front end 43. A front-end command for saving the frame buffer status bit 125 causes the value in the frame buffer status bit 125 to be written to a specified address in GPU memory 42 or system memory 50. A front-end command for restoring the frame buffer status bit 125 reads a value from a specified address in GPU memory 42 or system memory 50 and stores the value into the frame buffer status bit 125.

While the foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

What is claimed is:

1. A processing unit coupled to a memory unit, the processing unit comprising:
a processing pipeline having an optimized processing mode and configured to perform blend operations on graphics data and to read data from and write data to the memory unit;
a detector configured to detect the presence of a special value in the graphics data that indicates that the graphics data is dirty, wherein the optimized processing mode is disabled if the special value is detected; and
another detector configured to detect the presence of the special value in the graphics data,
wherein the detector monitors for the presence of the special value in an input data stream to the processing pipeline and the another detector monitors for the presence of the special value in an output data stream from the processing pipeline.

2. The processing unit according to claim 1, wherein the optimized processing mode is disabled locally if the special value is detected in the input data stream.

3. The processing unit according to claim 2, wherein the input data stream includes a series of input data and the optimized processing mode is disabled during processing of a particular input data if the particular input data is the special value.

4. The processing unit according to claim 1, wherein the optimized processing mode is disabled globally if the special value is detected in the output data stream.

5. The processing unit according to claim 4, wherein the memory unit is a frame buffer and the optimized processing mode is disabled during processing of any data stored in the frame buffer if the special value is detected in the output data stream.

6. The processing unit according to claim 5, wherein the frame buffer is associated with a flag that controls whether the optimized processing mode is disabled or enabled.

7. The processing unit according to claim 1, wherein the memory unit includes a plurality of pages, and each of said pages is associated with a bit whose value controls whether the optimized processing mode is disabled or enabled.

8. The processing unit according to claim 1, wherein the processing pipeline performs blend operations on fragment color values and the optimized processing mode comprises an optimized blend operation.

9. The processing unit according to claim 8, further comprising an interlock positioned directly upstream of the processing pipeline for holding a blend operation that is dependent on results of a prior blend operation until the results of the prior blend operation are available to be read.

10. A computing device comprising:
a memory unit for storing graphics data; and
a processing unit configured to perform blend operations on the graphics data, wherein the processing unit is configured to:
perform blend operations in accordance with a normal mode if a special value is detected in the graphics data and an optimized mode if the special value is not detected in the graphics data that indicates that the graphics data is dirty, and
read data from and write data to the memory unit.
wherein the processing unit includes a first special value detector that monitors for special values in an input data stream for blend operations and a second special value detector that monitors for special values in an output data stream of blend operations.

11. The computing device according to claim 10, wherein the processing unit disables blend optimizations while it is in the normal mode, and enables blend optimizations while it is in the optimized mode.

12. The computing device according to claim 10, wherein the input data stream includes a series of input data and the processing unit is in the normal mode during blend operations performed on a particular input data if the particular input data is the special value.

13. The computing device according to claim 10, wherein the memory unit is a frame buffer and the processing unit is in the normal mode during blend operations performed on any data stored in the frame buffer if the special value is detected in the output data stream.

14. A computer-implemented method of performing blend operations on graphics data by a graphics processing unit coupled to a memory unit within a computer system, the method comprising the steps of:
monitoring the graphics data for a special value input to a processing pipeline included in the graphics processing unit or output from the processing pipeline, wherein the processing unit is configured to read data from and write data to the memory unit, and wherein the special value indicates that the graphics data is dirty; and
performing blend operations in accordance with a normal mode if the special value is detected; and
performing blend operations in accordance with an optimized mode if the special value is not detected,
wherein the presence of the special value is monitored prior to and after performing the blend operations.

15. The method according to claim 14, wherein blend optimization is disabled when the blend operations are performed in accordance with the normal mode, and blend optimization is enabled when the blend operations are performed in accordance with the optimized mode.

16. The method according to claim 14, further comprising the step of setting a flag for indicating the presence of the special value if the special value is detected.

* * * * *